(12) United States Patent
Matsuoka et al.

(10) Patent No.: US 7,607,290 B2
(45) Date of Patent: Oct. 27, 2009

(54) EXHAUST PURIFYING APPARATUS FOR INTERNAL COMBUSTION ENGINE

(75) Inventors: Hiroki Matsuoka, Susono (JP);
Tatsuhisa Yokoi, Toyota (JP); Yasuhiko Otsubo, Toyota (JP); Shigehiro Matsuno, Toyota (JP); Takayoshi Inaba, Kariya (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 0 days.

(21) Appl. No.: 10/591,046

(22) PCT Filed: Mar. 10, 2005

(86) PCT No.: PCT/JP2005/004737

§ 371 (c)(1),
(2), (4) Date: Aug. 29, 2006

(87) PCT Pub. No.: WO2005/088089

PCT Pub. Date: Sep. 22, 2005

(65) Prior Publication Data

US 2007/0180818 A1 Aug. 9, 2007

(30) Foreign Application Priority Data

Mar. 11, 2004 (JP) ............................. 2004-068993

(51) Int. Cl.
*F01N 3/00* (2006.01)

(52) U.S. Cl. .................... 60/286; 60/274; 60/295; 60/297; 60/303

(58) Field of Classification Search ............... 60/274, 60/286, 295, 297, 303, 311
See application file for complete search history.

(56) References Cited

U.S. PATENT DOCUMENTS

| 4,608,640 | A | 8/1986 | Shinzawa et al. |
| 6,237,326 | B1 * | 5/2001 | Russell ..................... 60/274 |
| 6,304,815 | B1 * | 10/2001 | Moraal et al. ............ 701/115 |
| 6,405,528 | B1 * | 6/2002 | Christen et al. ............ 60/295 |
| 6,594,990 | B2 * | 7/2003 | Kuenstler et al. .......... 60/295 |
| 6,622,480 | B2 * | 9/2003 | Tashiro et al. ............. 60/295 |
| 6,948,311 | B2 * | 9/2005 | Schaller et al. ............ 60/286 |
| 6,952,918 | B2 * | 10/2005 | Imai et al. ................. 60/295 |

FOREIGN PATENT DOCUMENTS

EP 1 229 223 A1 8/2002

(Continued)

*Primary Examiner*—Tu M Nguyen
(74) *Attorney, Agent, or Firm*—Kenyon & Kenyon LLP

(57) ABSTRACT

An exhaust purifying apparatus for an internal combustion engine includes an exhaust purifying mechanism, a fuel adding device, an electronic control device. The exhaust purifying mechanism is located in an exhaust passage and traps particulate matter. The fuel adding device adds fuel to exhaust gas that passes through the mechanism. The electronic control device detects a pressure difference between a section upstream and a section downstream of the exhaust purifying mechanism. While the fuel adding device is adding fuel to exhaust gas, the electronic control device compares the pressure difference that is detected at a predetermined point in time with the pressure difference reference value. When the pressure difference exceeds the pressure difference reference value, the electronic control device sets the manner of adding fuel to intermittent fuel addition. As a result, the exhaust purifying apparatus decreases the amount of particulate matter that remains in the exhaust purifying mechanism.

16 Claims, 9 Drawing Sheets

FOREIGN PATENT DOCUMENTS

| | | |
|---|---|---|
| FR | 2 774 421 A | 8/1999 |
| FR | 2 832 758 A | 5/2003 |
| JP | 08-218847 A | 8/1996 |
| JP | 2002-227688 A | 8/2002 |
| JP | 2002-332822 A | 11/2002 |
| JP | 2003-020930 A | 1/2003 |

* cited by examiner

EXHAUST PURIFYING APPARATUS FOR INTERNAL COMBUSTION ENGINE

This is a 371 national phase application of PCT/JP2005/004737 filed 10 Mar. 2005, claiming priority to Japanese Patent Application No. 2004-068993 filed 11 Mar. 2004, the contents of which are incorporated herein by reference.

FIELD OF THE INVENTION

The present invention relates to an exhaust purifying apparatus for an internal combustion engine that adds fuel to an exhaust purifying member located in an exhaust passage.

BACKGROUND OF THE INVENTION

An exhaust purifying mechanism that purifies exhaust gas by trapping particulate matter (PM) in exhaust gas with a filter located in an exhaust passage has been employed for an internal combustion engine such as a vehicle diesel engine. In such an exhaust purifying mechanism, the filter needs to be regenerated by removing particulate matter accumulated in the filter before the filter is clogged by accumulation of trapped particulate matter.

Japanese Laid-Open Patent Publication No. 2003-20930 discloses an exhaust purifying apparatus that eliminates particulate matter in the filter. In the exhaust purifying apparatus of the above publication, the filter supports a catalyst that promotes oxidization of particulate matter, and fuel is added to exhaust gas that flows into the filter. The particulate matter trapped in the filter is oxidized (burned) by adding fuel, and the filter is thus regenerated.

When adding fuel as described above, if fuel keeps being added to the exhaust purifying mechanism, the fuel continues to be burned at the upstream section of the mechanism. Thus, exhaust gas having high temperature is continuously sent to the downstream section of the mechanism. Therefore, the temperature of the exhaust purifying mechanism tends to increase toward the downstream end. Thus, particulate matter is likely to remain at the upstream section of the mechanism. That is, particulate matter tends to partially remain unburned.

On the other hand, when intermittently adding fuel to exhaust gas, exhaust gas having high temperature is prevented from being continuously sent to the downstream section of the exhaust purifying mechanism. This suppresses the temperature distribution of the exhaust purifying mechanism from being uneven. Therefore, the amount of particulate matter that partially remains in the exhaust purifying mechanism is reduced.

Although the intermittent fuel addition suppresses particulate matter from partially remaining in the exhaust purifying mechanism, oxidization of particulate matter is promoted as compared to a case where the continuous fuel addition is performed. Therefore, if the intermittent fuel addition is not appropriately executed, the temperature of the exhaust purifying mechanism may be excessively increased.

SUMMARY OF THE INVENTION

Accordingly, it is an objective of the present invention to provide an exhaust purifying apparatus for an internal combustion engine that decreases the amount of particulate matter that remains in an exhaust purifying mechanism by appropriately executing an intermittent fuel addition.

To achieve the foregoing and other objectives and in accordance with the purpose of the present invention, an exhaust purifying apparatus for an internal combustion engine including an exhaust purifying mechanism, a fuel adding device, a detecting section, a comparing section, and a setting section is provided. The exhaust purifying mechanism is located in an exhaust passage of the internal combustion engine. The exhaust purifying mechanism traps particulate matter in exhaust gas. The fuel adding device adds fuel to exhaust gas that passes through the exhaust purifying mechanism. The detecting section detects a pressure difference between a section upstream and a section downstream of the exhaust purifying mechanism. While the fuel adding device is adding fuel to exhaust gas, the comparing section compares the pressure difference that is detected by the detecting section at a predetermined point in time with the pressure difference reference value that has been set in correspondence with the predetermined point in time. When the comparing section determines that the pressure difference exceeds the pressure difference reference value, the setting section sets the manner of adding fuel of the fuel adding device to intermittent fuel addition.

The present invention also provides a method for purifying exhaust gas of an internal combustion engine. The method includes: trapping particulate matter in exhaust gas by an exhaust purifying mechanism located in an exhaust passage of the internal combustion engine; adding fuel to exhaust gas that passes through the exhaust purifying mechanism; detecting a pressure difference between a section upstream and a section downstream of the exhaust purifying mechanism; comparing the pressure difference that is detected at a predetermined point in time with a pressure difference reference value that has been set in correspondence with the predetermined point in time, while the fuel addition is being executed; and setting the manner of adding fuel to intermittent fuel addition when it is determined that the pressure difference exceeds the pressure difference reference value.

DETAILED DESCRIPTION OF THE PREFERRED EMBODIMENTS

First Embodiment

An exhaust purifying apparatus for an internal combustion engine according to a first embodiment of the present invention will now be described with reference to FIGS. 1 to 3.

Figure 1:
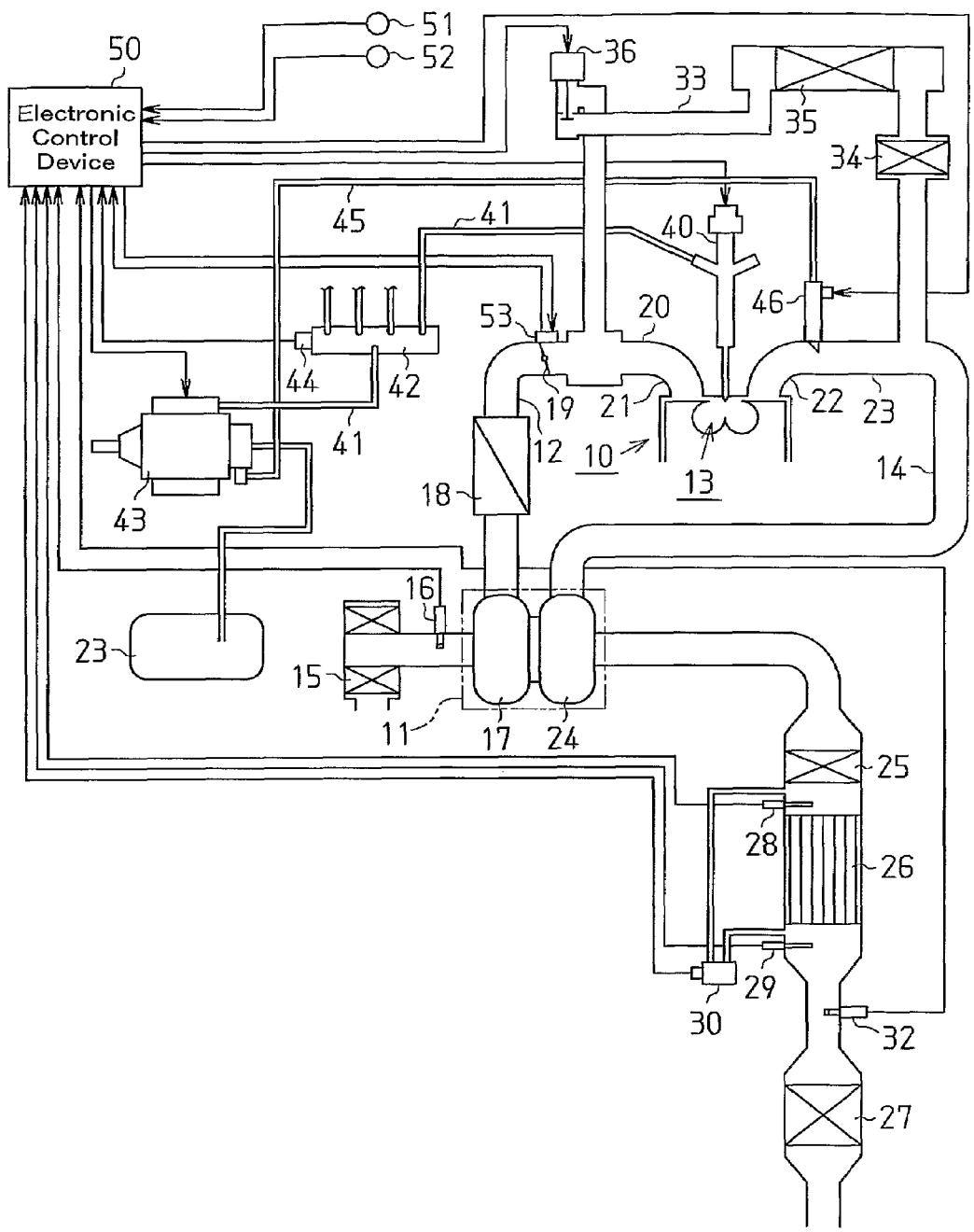
FIG. 1 is a diagram illustrating an internal combustion engine and its peripheral structure to which an exhaust purifying apparatus of an internal combustion engine according to a first embodiment of the present invention is applied.

FIG. 1 illustrates the configuration of an internal combustion engine 10 to which the exhaust purifying apparatus according to the first embodiment is applied. The internal combustion engine 10 is a diesel engine that includes a common rail fuel injection device and a turbocharger 11. The engine 10 includes an intake passage 12, combustion chambers 13, and an exhaust passage 14.

The intake passage 12 forms an intake system for the internal combustion engine 10. In the most upstream section of the intake passage 12, an air cleaner 15 is located. From the air cleaner 15 toward the downstream side, an air flow meter 16, a compressor 17 incorporated in the turbocharger 11, an intercooler 18, and an intake throttle valve 19 are provided in the intake passage 12. The intake passage 12 is branched at an intake manifold 20 located downstream of the intake throttle valve 19, and connected to each of the combustion chambers 13 of the internal combustion engine 10 through intake ports 21.

In the exhaust passage 14, which forms part of the exhaust system for the internal combustion engine 10, an exhaust port 22 is connected to each combustion chamber 13. The exhaust ports 22 are connected to an exhaust turbine 24 of the turbocharger 11 through an exhaust manifold 23. In a section of the exhaust passage 14 that is downstream of the exhaust turbine 24, an exhaust purifying mechanism is located. The exhaust purifying mechanism includes, in the order from the upstream end, a NOx catalytic converter 25, a DPNR converter 26, and an oxidation catalytic converter 27.

The NOx catalytic converter 25 supports a storage reduction NOx catalyst. The NOx catalyst stores NOx in exhaust gas when the concentration of oxygen in exhaust gas is high, and emits the stored NOx when the concentration of oxygen in the exhaust gas is low. If a sufficient amount of unburned fuel component, which functions as a reducing agent, exists in the vicinity thereof, the NOx catalyst reduces emitted NOx to purify the exhaust gas. The NOx catalytic converter 25 constitutes the exhaust purifying catalyst through which particulate matter in exhaust gas passes.

The DPNR converter 26 is made of a porous material and traps particulate matter in exhaust gas. Like the NOx catalytic converter 25, the DPNR converter 26 supports a storage reduction NOx catalyst. The NOx catalyst of the DPNR converter 26 reduces emitted NOx to purify the exhaust gas. The reaction triggered by the NOx catalyst oxidizes and removes the trapped particulate matter. The DPNR converter 26 constitutes an exhaust purifying member.

The oxidation catalytic converter 27 supports an oxidation catalyst. The oxidation catalyst oxidizes HC and CO in exhaust gas and purifies exhaust gas.

In sections upstream of and downstream of the DPNR converter 26 of the exhaust passage 14, a first gas temperature sensor 28 and a second gas temperature sensor 29 are provided, respectively. The first gas temperature sensor 28 detects an input gas temperature thci, which is the temperature of exhaust gas that flows into the DPNR converter 26. The second gas temperature sensor 29 detects an output gas temperature thco, which is the temperature of exhaust gas that has passed through the DPNR converter 26. Also, a detecting section, which is a differential pressure sensor 30 in the first embodiment, is provided in the exhaust passage 14. The differential pressure sensor 30 detects a pressure difference $\Delta P$ between a section upstream and a section downstream of the DPNR converter 26. Furthermore, an A/F sensor 32, which detects the air fuel ratio of exhaust gas, is located in the exhaust passage 14 between the DPNR converter 26 and the oxidation catalytic converter 27.

The internal combustion engine 10 further includes an exhaust gas recirculation device (EGR device) for returning some of the exhaust gas to the air in the intake passage 12. The EGR device includes an EGR passage 33 that connects the exhaust passage 14 with the intake passage 12. The most upstream section of the EGR passage 33 is connected to a section of the exhaust passage 14 that is upstream of the exhaust turbine 24. In the EGR passage 33, an EGR catalyst 34, an EGR cooler 35, and an EGR valve 36 are provided in this order from the upstream side. The EGR catalyst 34 reforms recirculated exhaust gas. The EGR cooler 35 cools the reformed exhaust gas. The EGR valve 36 adjusts the flow rate of the reformed and cooled exhaust gas. The most downstream section of the EGR passage 33 is connected to a section of the intake passage 12 that is downstream of the intake throttle valve 19.

An injector 40 is provided in each combustion chamber 13 of the internal combustion engine 10 to inject fuel to be combusted in the combustion chamber 13. The injectors 40 are connected to a common rail 42 with a high-pressure fuel pipe 41. High-pressure fuel is supplied to the common rail 42 through a fuel pump 43. The pressure of high-pressure fuel in the common rail 42 is detected by a rail pressure sensor 44 attached to the common rail 42.

The fuel pump 43 is capable of supplying low-pressure fuel to a fuel adding valve 46 through a low-pressure fuel pipe 45. The fuel adding valve 46 is provided in the exhaust port 22 of a specific cylinder and injects fuel to the exhaust turbine 24. In this manner, the fuel adding valve 46 adds fuel to exhaust gas.

An electronic control device 50 that is in charge of various controls of the internal combustion engine 10 includes a CPU that executes various computation processes related to control of the engine 10, a ROM storing programs and data necessary for the control, a RAM for temporarily storing the computation results of the CPU, and input and output ports for inputting and outputting signals from and to the outside. In addition to the above described sensors, the input port of the electronic control device 50 is connected to an engine rotational speed sensor 51 for detecting the rotational speed NE of the engine 10, an acceleration pedal sensor 52 for detecting the degree of depression of an acceleration pedal, and a throttle valve sensor 53 for detecting the opening degree of the intake throttle valve 19. The output port of the electronic control device 50 is connected to a drive circuit for driving the intake throttle valve 19, the injectors 40, the fuel pump 43, the fuel adding valve 46, and the EGR valve 36.

Based on detected signals from the above described sensors, the electronic control device 50 grasps the operating condition of the engine 10. According to the grasped operating condition, the electronic control device 50 outputs command signals to the drive circuits of the devices connected to the output port. The electronic control device 50 executes various control procedures such as control of the timing and the amount of fuel injection from the injector 40, control of the opening degree of the intake throttle valve 19, and EGR control based on the opening degree control of the EGR valve 36.

The electronic control device 50 adds fuel to exhaust gas from the fuel adding valve 46 as part of the controls. The fuel adding valve 46 adds fuel to exhaust gas during the following controls, that is, a PM elimination control, a NOx reduction control, and an S release control.

The PM elimination control is executed for burning particulate matter trapped by the DPNR converter 26 and discharging the particulate matter as carbon dioxide ($CO_2$) and water ($H_2O$). This eliminates the clogging of the DPNR converter 26. In the PM elimination control, the fuel adding valve 46 continuously adds fuel to exhaust gas, thereby oxidizing the added fuel in the exhaust gas and on the catalyst. The heat generated by the oxidization is used to increase the catalyst bed temperature (for example, to 600° C. to 700° C.). Accordingly, the PM is burned.

The NOx reduction control is executed for reducing the NOx stored by the NOx catalytic converter 25 and the NOx catalyst of the DPNR converter 26 to nitrogen ($N_2$), carbon dioxide ($CO_2$), and water ($H_2O$) and releasing them. During the NOx reduction control, the fuel adding valve 46 intermittently adds fuel to exhaust gas at a certain interval so that the exhaust gas about the NOx catalyst is temporarily low in oxygen concentration and contains a large amount of unburned fuel component. In other words, rich spike is intermittently executed. This promotes release of NOx from the NOx catalyst and reduction of NOx. That is, NOx is reduced and purified.

The S release control is executed for restoring the NOx storage performance that is degraded when the sulfur oxide (SOx) is stored by the NOx catalyst. When the S release control is started, the fuel adding valve 46 continuously adds fuel to exhaust gas as in the PM elimination control, thereby increasing the catalyst bed temperature (for example, to a temperature in a range from 600° C. to 700° C.). Thereafter, as in the NOx reduction control, the fuel adding valve 46 intermittently adds fuel to exhaust gas for performing rich spike. This promotes release of SOx from the NOx catalysts and reduction of the SOx. Accordingly, the NOx storage performance is restored.

In the internal combustion engine 10, the injector 40 may execute after injection during the PM elimination control or while the catalyst bed temperature is being increased during the S release control. The after injection is injection performed after main injection in which fuel is injected to the combustion chamber 13 so that fuel is combusted in the combustion chamber 13. Most of fuel injected by the after injection is not burned in the combustion chamber 13 but is discharged to the exhaust passage. The after injection promotes the catalyst bed temperature to increase by increasing the amount of unburned fuel components in exhaust gas. The fuel adding valve 46, the after injection, and the like constitute an adding device.

As described above, the first embodiment maintains the exhaust purification performance of the internal combustion engine 10 by adding fuel to exhaust gas from the fuel adding valve 46, which is located in the exhaust passage, or by executing the after injection from the injector 40 depending on the circumstances.

When fuel keeps being added to the NOx catalytic converter 25 and the DPNR converter 26 by the execution of the above mentioned PM elimination control, the fuel continues to be burned at the upstream section of each converter 25, 26. Thus, exhaust gas having high temperature is continuously sent to the downstream section of each converter 25, 26. Therefore, the temperature of the NOx catalytic converter 25 and the DPNR converter 26 increases toward the downstream section. Thus, particulate matter tends to remain at the upstream section of the DPNR converter 26. That is, particulate matter tends to partially remain unburned. When fuel is continuously added, the temperature of the NOx catalytic converter 25, which is located upstream of the DPNR converter 26, tends to stay low. Therefore, particulate matter easily collects on the front end portion of the NOx catalytic converter 25. As a result, clogging may occur.

In the first embodiment, a burn-up control is added as the control for adding fuel to exhaust gas by the fuel adding valve 46. In the burn-up control, fuel is intermittently added to exhaust gas from the fuel adding valve 46. Accordingly, the following advantage is obtained.

That is, when intermittently adding fuel to exhaust gas, high temperature gas is prevented from being continuously sent to the downstream section of the NOx catalytic converter 25 and the DPNR converter 26. This suppresses the temperature distribution of each converter 25 or 26 from being uneven. As a result, the amount of particulate matter that remains partially in the DPNR converter 26 is reduced and the amount of particulate matter collected at the front end portion of the NOx catalytic converter 25 is also reduced.

If particulate matter remains in the DPNR converter 26, the residual particulate matter may be abruptly burned when the PM elimination control is executed next time. Since the amount of particulate matter that remains in the DPNR converter 26 is reduced when the burn-up control is executed, the abrupt burning of particulate matter is also suppressed.

Although the intermittent fuel addition reduces the amount of particulate matter that remains partially in the DPNR converter 26 and the amount of particulate matter collected at the front end portion of the NOx catalytic converter 25, oxidation of the particulate matter is promoted as compared to the case where fuel is continuously added by the execution of the PM elimination control. Therefore, if the intermittent fuel addition is not appropriately executed, the temperature of the DPNR converter 26 may be excessively increased.

As the amount of particulate matter trapped by the DPNR converter 26 decreases by the fuel addition of the PM elimination control, the pressure difference between the sections upstream and downstream of the DPNR converter 26 is decreased. Therefore, the residual amount of particulate matter is estimated based on the pressure difference.

The first embodiment includes a comparing section for comparing the pressure difference at a predetermined point in time with the pressure difference reference value, which is the reference value of the pressure difference corresponding to the predetermined point in time, while executing the fuel addition of the PM elimination control. The first embodiment also includes a switching section for switching the manner of adding fuel to the intermittent fuel addition, in other words, executing the burn-up control when the comparing section determines that the pressure difference at the predetermined point in time is greater than the pressure difference reference value. That is, the first embodiment switches the manner of adding fuel to the intermittent fuel addition when the amount of particulate matter is not sufficiently decreased while fuel is being added in a state other than the intermittent fuel addition.

The state of the burn-up control according to the first embodiment of the present invention will now be described with reference to FIGS. 2 and 3.

Figure 2:
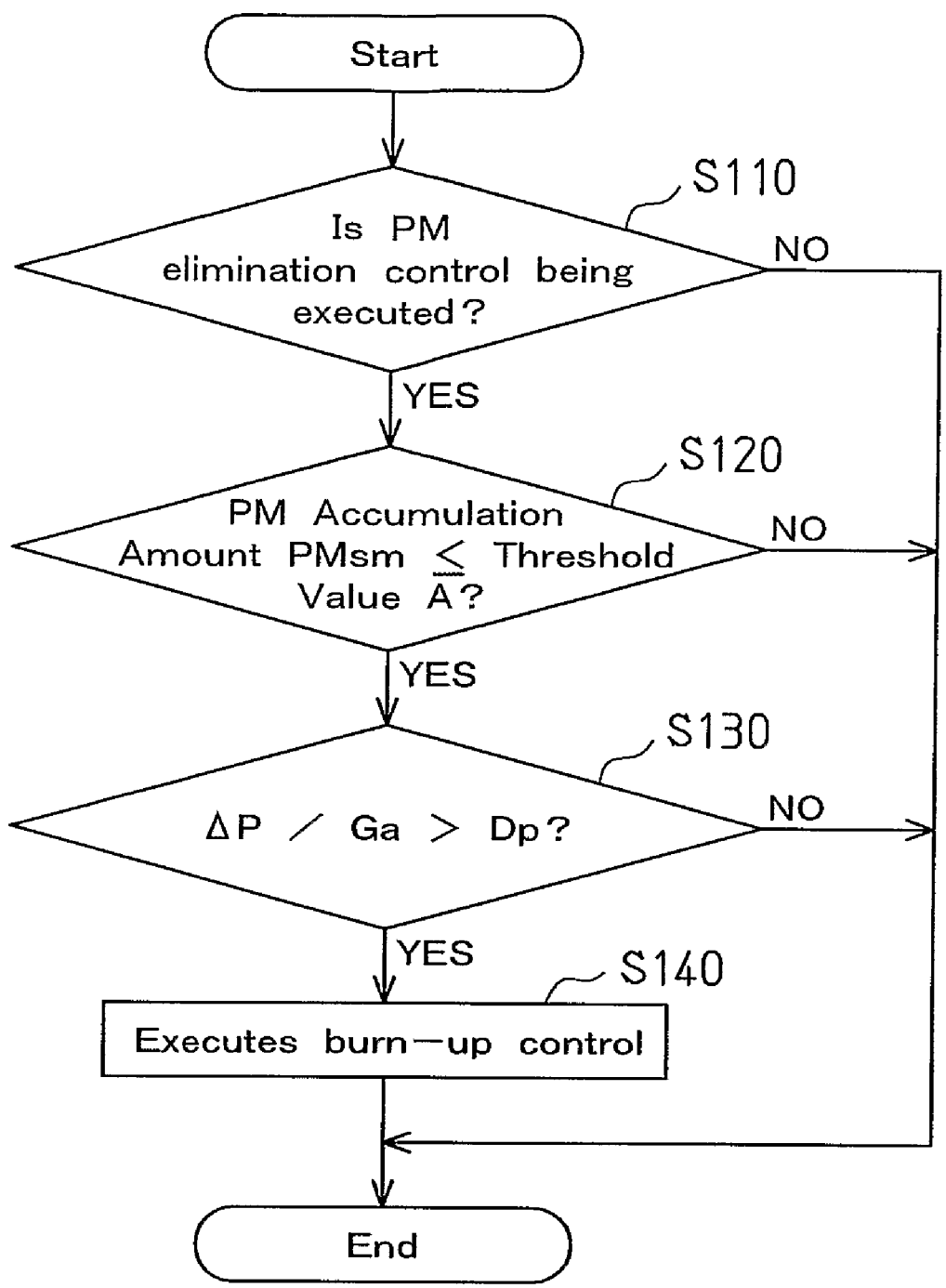
FIG. 2 is a flowchart showing a procedure for a burn-up control according to the first embodiment.

A series of processes shown in FIG. 2 represents a procedure of the burn-up control and is repeatedly executed by the electronic control device 50 at predetermined time intervals.

When the procedure is started, the electronic control device 50 determines whether the PM elimination control is being executed at step S110. The PM elimination control is executed when a PM accumulation amount PMsm in the DPNR converter 26 estimated by a separate process reaches a PM elimination reference value PMstart. The estimated accumulation amount PMsm is computed using the following formula (1).

$$PMsm \leftarrow Max[PMsm+PMe-PMc, "0"] \quad (1)$$

PMsm: PM accumulation amount
PMe: PM emission amount
PMc: oxidation amount of PM The PM emission amount PMe is the amount of particulate matter emitted from the combustion chambers of the internal combustion engine 10. The PM emission amount PMe is computed in accordance with a map obtained through experiments in advance, that is, a PM emission amount computation map, which includes the engine rotational speed NE and the engine load (the fuel injection amount from the injector 40) as parameters.

The oxidation amount PMc is the amount of particulate matter trapped by the DPNR converter 26 that is purified by oxidization. The oxidation amount PMc is computed in accordance with a map obtained through experiments in advance, that is, an oxidation amount computation map, which includes the bed temperature of the DPNR converter 26 (in this embodiment, the output gas temperature thco detected by the second gas temperature sensor 29) and the intake air amount Ga detected by the air flow meter 16 as parameters.

The PM accumulation amount PMsm on the right side of the formula (1) is a value of the PM accumulation amount PMsm that has been computed in the preceding execution. Max on the right side is an operator for extracting the greatest value from the values in the parentheses. Therefore, if "PMsm+PMe−PMc" has a positive value, it is used as the current PM accumulation amount PMsm. If "PMsm+PMe−PMc" has a negative value, 0 is used as the PM accumulation amount PMsm. If the PM emission amount PMe continues to be greater than the oxidation amount PMc (PM emission amount PMe>Oxidation amount PMc) due to the operating condition of the internal combustion engine 10, the estimated PM accumulation amount PMsm gradually increases. On the other hand, when fuel is added, the PM emission amount PMe becomes less than the oxidation amount PMc (PM emission amount PMe<Oxidation amount PMc), and the estimated PM accumulation amount PMsm gradually decreases.

At step S110, if it is determined that the PM elimination control is not being executed, that is, if the decision outcome of step S110 is negative, the electronic control device 50 temporarily suspends the routine.

On the other hand, if it is determined that the PM elimination control is being executed, that is, if the decision outcome of step S110 is positive, the electronic control device 50 proceeds to step S120. At step S120, the electronic control device 50 determines whether the current PM accumulation amount PMsm is less than or equal to a threshold value A. The threshold value A is set as a value for determining whether the current PM accumulation amount PMsm is small enough so that even if the intermittent fuel addition of the burn-up control is executed, particulate matter in the DPNR converter 26 is not abruptly oxidized and burned, and the thermal degradation of the DPNR converter 26 does not occur. The threshold value A is a value smaller than the PM elimination reference value PMstart and is optimized through experiments performed in advance.

If it is determined that the current PM accumulation amount PMsm is greater than the threshold value A, that is, if the decision outcome of step S120 is negative, the electronic control device 50 determines that a large amount of particulate matter still remains in the DPNR converter 26 and there is a possibility that the particulate matter will be abruptly burned in the DPNR converter 26 if fuel is intermittently added. Thus, the electronic control device 50 temporarily suspends the routine without executing the burn-up control. At this time, the continuous fuel addition of the PM elimination control is keeps being executed.

On the other hand, if the amount of particulate matter in the DPNR converter 26 is decreased by continuing the PM elimination control and it is determined that the current PM accumulation amount PMsm is less than or equal to the threshold value A, that is, if the decision outcome of step S120 is positive, the electronic control device 50 assumes that the intermittent fuel addition will not cause abrupt burning of particulate matter in the DPNR converter 26. Therefore, the electronic control device 50 proceeds to step S130 and determines whether the value $\Delta P/Ga$, which is the ratio of the pressure difference $\Delta P$ to the intake air amount Ga, is greater than the pressure difference reference value Dp. The pressure difference reference value Dp is a value set in accordance with the pressure difference $\Delta P$ when the actual accumulation amount of particulate matter is equal to the threshold value A and is optimized through experiments performed in advance.

When estimating the residual amount of particulate matter, the estimation accuracy is improved by using the ratio of the pressure difference $\Delta P$ to the flow rate of exhaust gas ($\Delta P$/flow rate of exhaust gas). Since the intake air amount Ga is directly proportional to the flow rate of exhaust gas, using the ratio of the pressure difference $\Delta P$ to the intake air amount Ga ($\Delta P/Ga$) will not decrease the accuracy. Instead of comparing the value $\Delta P/GA$ with the pressure difference reference value Dp, the pressure difference $\Delta P$ may be used as the pressure difference of exhaust gas and compared with a value that is increased as the exhaust flow rate (or the intake air amount GA) is increased. For example, the pressure difference $\Delta P$ may be compared with a value $Dp \times GA$. Furthermore, the pressure difference $\Delta P$ may simply be compared with a predetermined reference value.

If it is determined that the value $\Delta P/GA$ is less than or equal to the pressure difference reference value Dp, that is, if the decision outcome of step S130 is negative, the electronic control device 50 determines that particulate matter is reliably being burned by executing the PM elimination control. Therefore, the electronic control device 50 temporarily suspends the routine without executing the burn-up control. At this time, the continuous fuel addition of the PM elimination control keeps being executed.

On the other hand, if it is determined that the value $\Delta P/GA$ is greater than the pressure difference reference value Dp, that is, if the decision outcome of step S130 is positive, the electronic control device 50 determines that particulate matter is not sufficiently burned and is likely to remain. Therefore, the electronic control device 50 proceeds to step S140 and executes the burn-up control. That is, the manner of adding fuel is switched from the continuous fuel addition of the PM elimination control to the intermittent fuel addition, and the routine is temporarily suspended. The burn-up control is preferably terminated when the PM accumulation amount PMsm becomes zero, when the pressure difference $\Delta P$ is sufficiently decreased so that it is determined that the residual amount of particulate matter is sufficiently decreased, or when fuel is added through the intermittent fuel addition the predetermined number of times.

Figure 3:
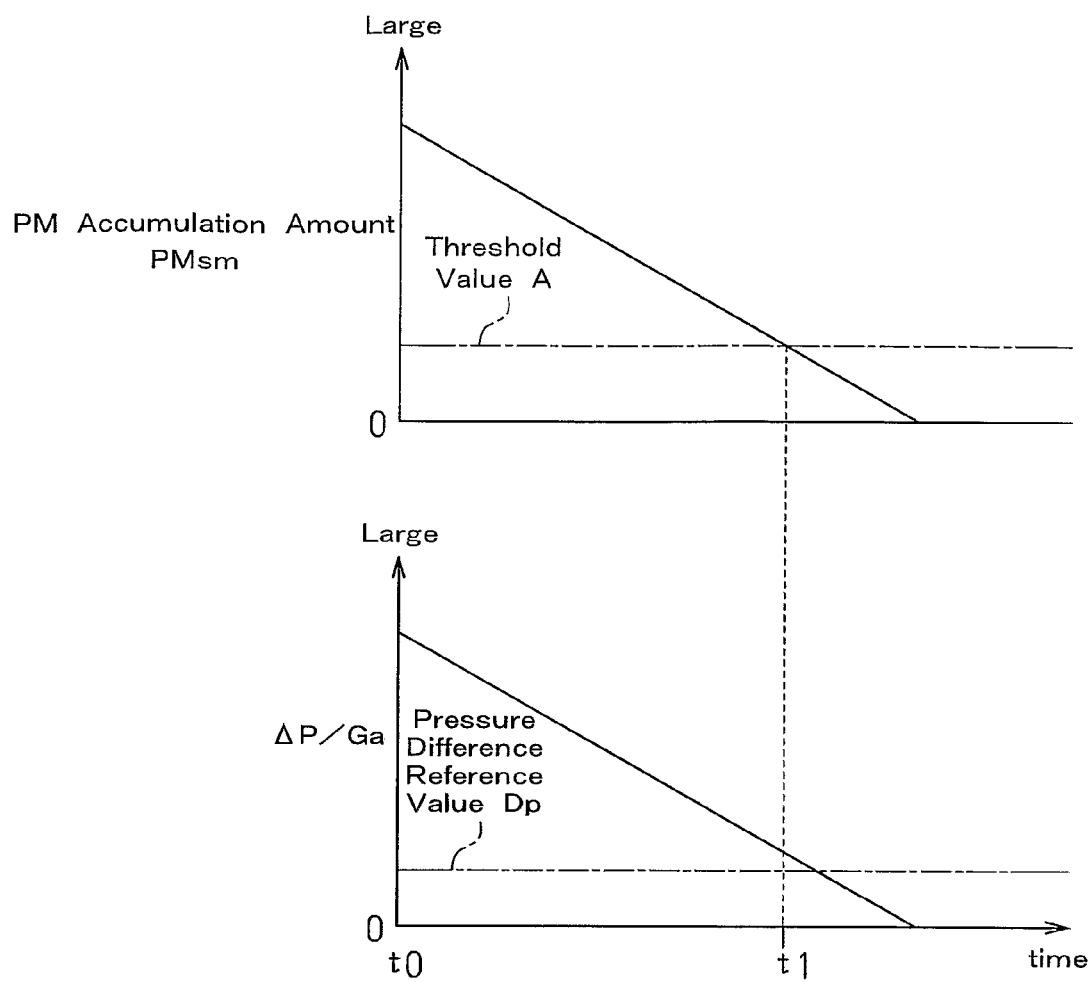
FIG. 3 is a time chart showing a point in time for comparing a pressure difference according to the first embodiment.

FIG. 3 shows the point in time for comparing the pressure difference when the burn-up control process is performed. In FIG. 3, the PM accumulation amount PMsm has reached the PM elimination reference value PMstart at time t0, and the PM elimination control is already being executed.

As shown in FIG. 3, the amount of particulate matter in the DPNR converter 26 decreases by the continuous fuel addition of the PM elimination control and the PM accumulation amount PMsm gradually decreases. During the period in which the PM accumulation amount PMsm is greater than the threshold value A, which is from time t0 to time t1, the continuous fuel addition is set as the manner of adding fuel. When the PM accumulation amount PMsm becomes less than or equal to the threshold value A at time t1, the value ΔP/Ga is compared with the pressure difference reference value Dp. If it is determined that the value ΔP/Ga is greater than the pressure difference reference value Dp, the manner of adding fuel is switched to the intermittent fuel addition at time t1. After time t1, the oxidization of particulate matter that remains in the DPNR converter 26 is promoted and the amount of particulate matter collected on the front end portion of the NOx catalytic converter 25 is also decreased by executing the intermittent fuel addition.

The present embodiment has the following advantages.

(1) During execution of fuel addition of the PM elimination control, if the pressure difference at the predetermined point in time is greater than the pressure difference reference value Dp, which is the reference value of the pressure difference corresponding to the predetermined point in time, the manner of adding fuel is switched to the intermittent fuel addition. That is, the first embodiment switches the manner of adding fuel to the intermittent fuel addition when the amount of particulate matter is not sufficiently decreased while fuel is being added in a state other than the intermittent fuel addition. Therefore, the intermittent fuel addition is appropriately executed, thereby decreasing the amount of particulate matter that remains in the DPNR converter 26.

If particulate matter remains in the DPNR converter 26, the residual particulate matter may be abruptly burned when fuel is added next time. Since the amount of particulate matter that remains in the DPNR converter 26 is reduced in the first embodiment, the abrupt burning of particulate matter is also suppressed.

(2) The pressure difference is compared with the pressure difference reference value Dp at the point in time where the PM accumulation amount PMsm becomes less than or equal to the predetermined threshold value A. That is, the point in time for comparing the pressure difference is set based on the PM accumulation amount PMsm. Therefore, the comparison of the pressure difference is performed when the accumulation amount of particulate matter is decreased by a certain amount. As a result, a state that may cause the temperature of the DPNR converter 26 to be excessively increased is avoided. For example, abrupt oxidization of a large amount of particulate matter caused by the intermittent fuel addition is avoided.

Second Embodiment

An exhaust purifying apparatus for an internal combustion engine according to a second embodiment of the present invention will now be described with reference to FIGS. 4 and 5.

In the first embodiment, the pressure difference is compared at the point in time where the PM accumulation amount PMsm becomes less than or equal to the threshold value A while the PM elimination control is being executed. The second embodiment differs from the first embodiment in that, in addition to the above point in time for comparing, the pressure difference is compared after the manner of adding fuel is switched to the intermittent addition of the burn-up control. The differences from the first embodiment will be mainly discussed below.

Figure 4:
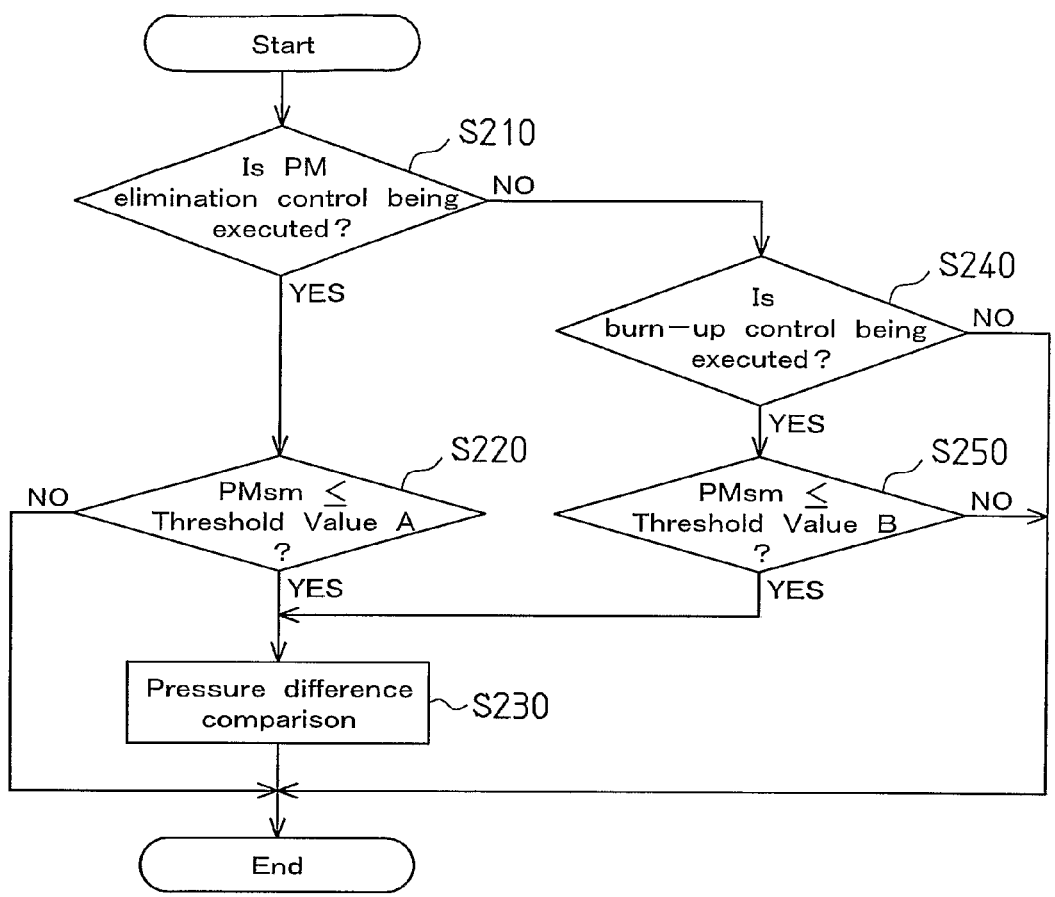
FIG. 4 is a flowchart showing a procedure for a determination routine according to a second embodiment.

A series of processes shown in FIG. 4 represents a procedure for a determination routine for determining whether to perform the comparison of the pressure difference. The procedure is repeated by the electronic control device 50 at predetermined time intervals.

When the routine is started, the electronic control device 50 determines whether the PM elimination control is being executed at step S210. The process performed at step S210 is the same as that performed at step S110 shown in FIG. 2.

If it is determined that the PM elimination control is being executed at step S210, that is, if the decision outcome of step S210 is positive, the electronic control device 50 proceeds to step S220. At step S220, the electronic control device 50 determines whether the current PM accumulation amount PMsm is less than or equal to the threshold value A. The process performed at step S220 is the same as that performed at step S120 shown in FIG. 2. If it is determined that the current PM accumulation amount PMsm is greater than the threshold value A, that is, if the decision outcome of step S220 is negative, the electronic control device 50 temporarily suspends the routine.

On the other hand, if it is determined that the current PM accumulation amount PMsm is less than or equal to the threshold value A, that is, if the decision outcome of step S220 is positive, the electronic control device 50 proceeds to step S230. At step S230, the electronic control device 50 performs the comparison of the pressure difference in the same manner as the process performed at step S130 shown in FIG. 2 and temporarily suspends the routine.

If it is determined that the PM elimination control is not being executed at step S210, that is, if the decision outcome of step S210 is negative, the electronic control device 50 proceeds to step S240 and determines whether the burn-up control is being executed. If it is determined that the burn-up control is not being executed, the electronic control device 50 temporarily suspends the routine.

On the other hand, if it is determined that the burn-up control is being executed, that is, if the decision outcome of step S240 is positive, the electronic control device 50 proceeds to step S250. At step S250, the electronic control device 50 determines whether the current PM accumulation amount PMsm is less than or equal to a threshold value B. The threshold value B is set to a value smaller than the threshold value A. If it is determined that the current PM accumulation amount PMsm is greater than the threshold value B, that is, if the decision outcome of step S250 is negative, the electronic control device 50 temporarily suspends the routine.

On the other hand, if it is determined that the current PM accumulation amount PMsm is less than or equal to the threshold value B, that is, if the decision outcome of step S250 is positive, the electronic control device 50 proceeds to step S230. At step S230, if it is determined that the value ΔP/Ga is less than or equal to the pressure difference reference value Dp, the electronic control device 50 determines that the residual amount of particulate matter is decreasing by the execution of the burn-up control and temporarily suspends the routine.

Figure 5:
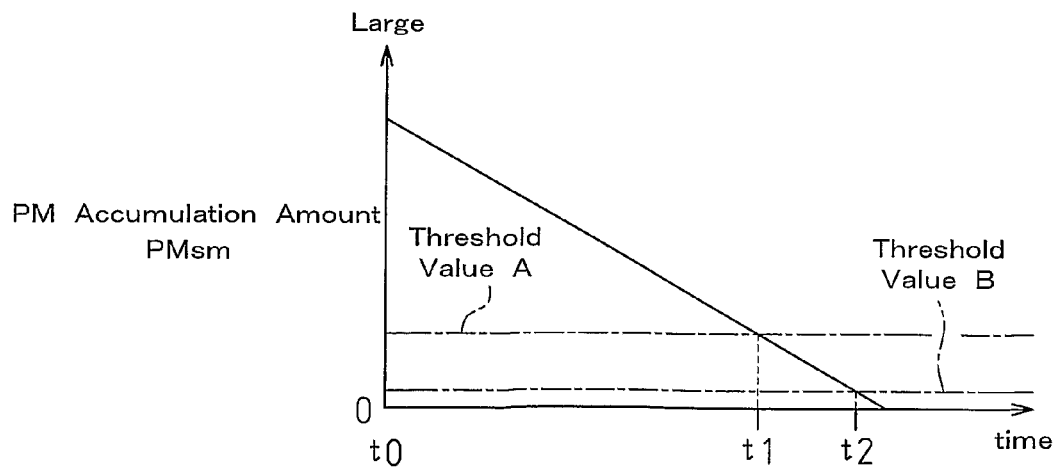
FIG. 5 is a time chart showing a point in time for comparing a pressure difference according to the second embodiment.

FIG. 5 shows the point in time for comparing the pressure difference when the determination routine is performed. In FIG. 5, the PM accumulation amount PMsm has reached the PM elimination reference value PMstart at time t0, and the PM elimination control is already being executed.

As shown in FIG. 5, the amount of particulate matter in the DPNR converter 26 decreases by the continuous fuel addition of the PM elimination control and the PM accumulation amount PMsm gradually decreases. During the period in which the PM accumulation amount PMsm is greater than the threshold value A, which is from time t0 to time t1, the continuous fuel addition is set as the manner of adding fuel. When the PM accumulation amount PMsm becomes less than or equal to the threshold value A at time t1, the value ΔP/Ga is compared with the pressure difference reference value Dp. If it is determined that the value ΔP/Ga is greater than the pressure difference reference value Dp, the manner of adding fuel is switched to the intermittent fuel addition at time t1. Thereafter, the amount of particulate matter remaining in the DPNR converter 26 is decreased by the intermittent addition of the burn-up control, and the PM accumulation amount PMsm is gradually decreased. At the point in time where the PM accumulation amount PMsm became less than or equal to the threshold value B, the value ΔP/Ga is compared with the pressure difference reference value Dp again. The electronic control device 50 then determines whether the residual amount of particulate matter is decreasing.

As described above, the second embodiment performs the comparison of the pressure difference even after the manner of adding fuel is switched to the intermittent fuel addition. Therefore, the electronic control device 50 is capable of determining whether the residual amount of particulate matter is decreasing by the intermittent fuel addition.

Third Embodiment

An exhaust purifying apparatus for an internal combustion engine according to a third embodiment of the present invention will now be described with reference to FIGS. 6 and 7.

In the first embodiment, the value ΔP/Ga is compared with the pressure difference reference value Dp before the burn-up control is started. The third embodiment differs from the first embodiment in that, in addition to the above comparison, the value ΔP/Ga is compared with the pressure difference reference value Dp even after the burn-up control is started. The differences from the first embodiment will be mainly discussed below.

Figure 6:
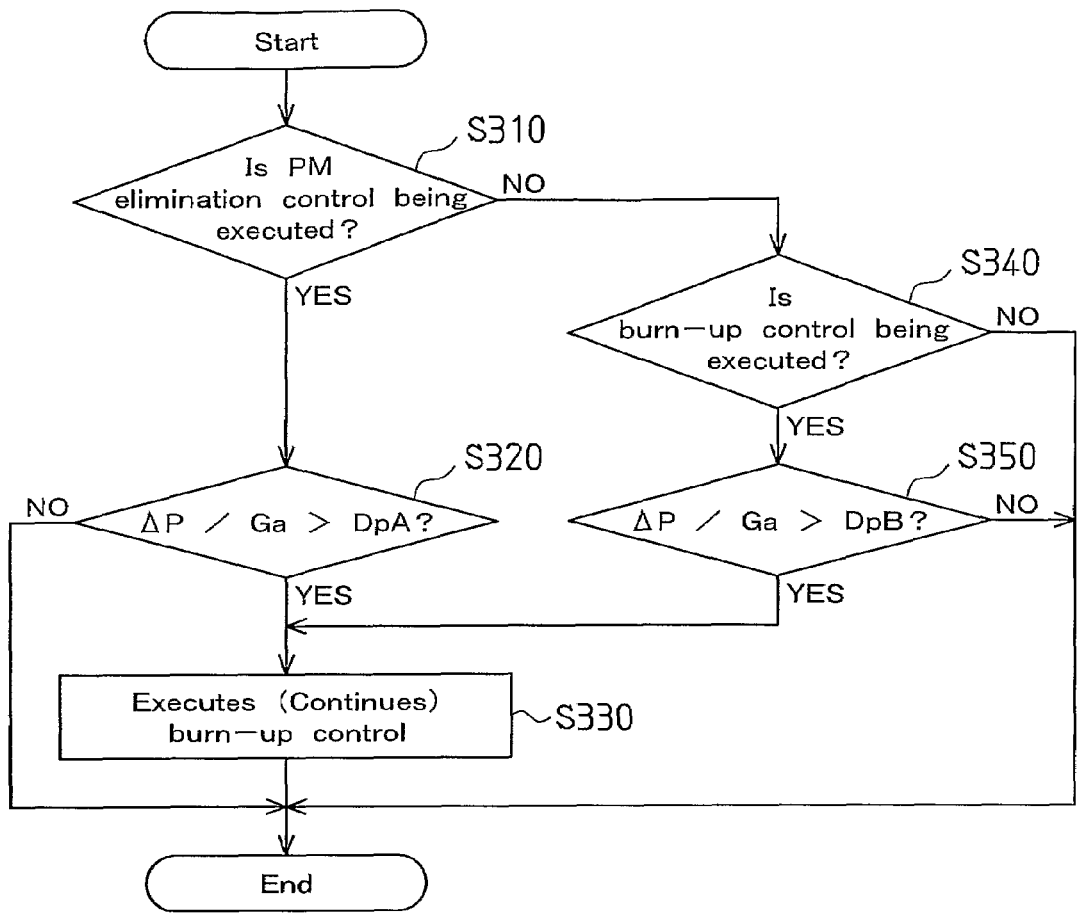
FIG. 6 is a flowchart showing a procedure for comparing the pressure difference according to a third embodiment.

A series of processes shown in FIG. 6 represents a comparison procedure of the pressure difference. The procedure is repeated by the electronic control device 50 at predetermined time intervals.

When the procedure is started, the electronic control device 50 determines whether the PM elimination control is being executed at step S310. The process performed at step S310 is the same as that performed at step S110 shown in FIG. 2.

If it is determined that the PM elimination control is being executed at step S310, that is, if the decision outcome of step S310 is positive, the electronic control device 50 proceeds to step S320. At step S320, the electronic control device 50 determines whether the value ΔP/Ga is greater than the pressure difference reference value DpA. The process of step S320 is the same as that of step S130 shown in FIG. 2. The pressure difference reference value DpA has the same value as the pressure difference reference value Dp. If it is determined that the value ΔP/Ga is less than or equal to the pressure difference reference value DpA, that is, if the decision outcome of step S320 is negative, the electronic control device 50 temporarily suspends the routine.

On the other hand, if it is determined that the value ΔP/Ga is greater than the pressure difference reference value DpA, that is, if the decision outcome of step S320 is positive, the electronic control device 50 proceeds to step S330. At step S330, the electronic control device 50 switches the manner of adding fuel to the intermittent fuel addition of the burn-up control in the same manner as the process of step S140 shown in FIG. 2 and temporarily suspends the routine.

If it is determined that the PM elimination control is not being executed at step S310, that is, if the decision outcome of step S310 is negative, the electronic control device 50 proceeds to step S340 and determines whether the burn-up control is being executed. If it is determined that the burn-up control is not being executed, the electronic control device 50 temporarily suspends the routine.

On the other hand, if it is determined that the burn-up control is being executed, that is, if the decision outcome of step S340 is positive, the electronic control device 50 proceeds to step S350. At step S350, the electronic control device 50 determines whether the value ΔP/Ga that uses the currently detected pressure difference ΔP is greater than the pressure difference reference value DpB. The pressure difference reference value DpB has a value smaller than the pressure difference reference value DpA. More preferably, the pressure difference reference value DpB has a value for determining that the residual amount of particulate matter is sufficiently decreased. If it is determined that the value ΔP/Ga is greater than the pressure difference reference value DpB, that is, if the decision outcome of step S350 is positive, the electronic control device 50 determines that the residual amount of particulate matter is not sufficiently decreased and proceeds to step S330. At step S330, the electronic control device 50 continues executing the burn-up control and temporarily suspends the routine.

On the other hand, if it is determined that the value ΔP/Ga is less than or equal to the pressure difference reference value DpB, that is, if the decision outcome of step S350 is negative, the electronic control device 50 temporarily suspends the routine. At step S350, when it is determined that the value ΔP/Ga is less than or equal to the pressure difference reference value DpB, the electronic control device 50 determines that the residual amount of particulate matter is reliably being decreased by the intermittent fuel addition and terminates the burn-up control.

Figure 7:
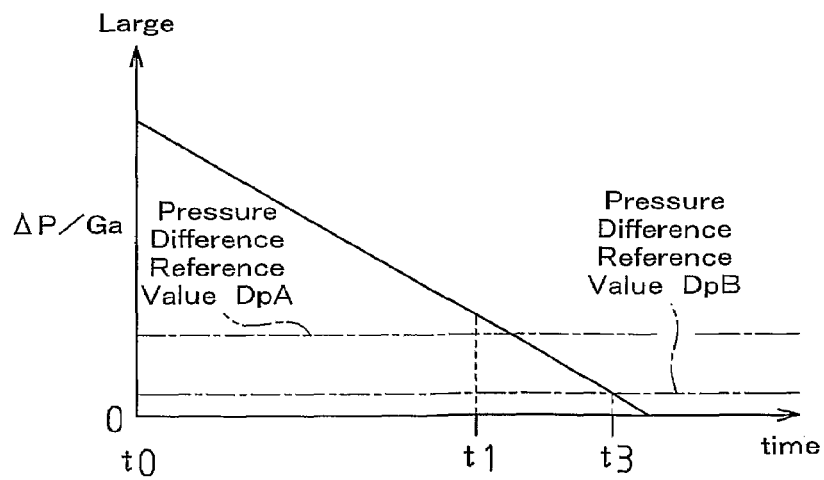
FIG. 7 is a time chart showing points in time for comparing a pressure difference according to the third embodiment.

FIG. 7 shows the points in time for comparing the pressure difference when the comparison procedure is performed. In FIG. 7, the PM accumulation amount PMsm has reached the PM elimination reference value PMstart at time t0, and the PM elimination control has already been started.

As shown in FIG. 7, the amount of particulate matter in the DPNR converter 26 decreases by the continuous fuel addition of the PM elimination control and the value ΔP/Ga gradually decreases. During the period in which the PM accumulation amount PMsm is greater than the threshold value A, which is from time t0 to time t1, the continuous fuel addition is set as the manner of adding fuel. When the PM accumulation amount PMsm becomes less than or equal to the threshold value A at time t1, the value ΔP/Ga is compared with the pressure difference reference value DpA. If it is determined that the value ΔP/Ga is greater than the pressure difference reference value DpA, the manner of adding fuel is switched to the intermittent fuel addition at time t1. Thereafter, the amount of particulate matter remaining in the DPNR converter 26 is decreased by the intermittent addition of the burn-up control, and the value ΔP/Ga is gradually decreased. When the value ΔP/Ga becomes less than or equal to the pressure difference reference value DpB at time t3, the electronic control device 50 determines that the residual amount of particulate matter is reliably decreased by the intermittent fuel addition and terminates the burn-up control.

As described above, according to the third embodiment, the electronic control device 50 is capable of determining that the residual amount of particulate matter is reliably decreased by the intermittent fuel addition. This prevents the intermittent fuel addition from being continued excessively.

If it is determined that the PM accumulation amount PMsm is less than or equal to the threshold value B in the process of step S250 described in the second embodiment, the process of step S350 according to the third embodiment, that is, the comparison of the value ΔP/Ga with the pressure difference reference value DpB may be performed.

Fourth Embodiment

An exhaust purifying apparatus for an internal combustion engine according to a fourth embodiment of the present invention will now be described with reference to FIGS. 8 and 9.

When particulate matter is oxidized and burned by adding fuel, part of the particulate matter is turned into noncombustible matter such as ash. When the noncombustible matter remains in the DPNR converter 26, the residual amount of the noncombustible matter affects the pressure difference ΔP. This may decrease the determination accuracy when comparing the pressure difference and making determination as described above. In the fourth embodiment, the residual amount of ash is estimated. Based on the estimated value, the pressure difference reference values DpA, DpB of the third embodiment are corrected.

Figure 8:
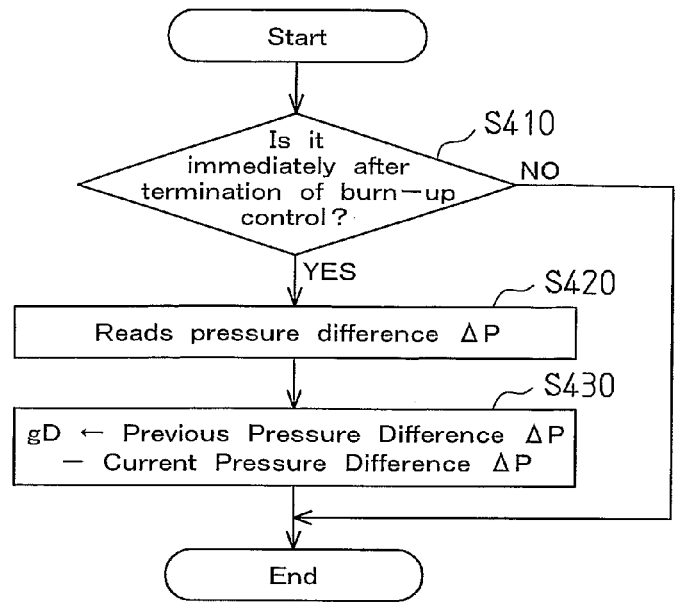
FIG. 8 is a flowchart showing a procedure for computing the ash learned value according to a fourth embodiment.

A series of processes shown in FIG. 8 represents a procedure for computing an ash learned value gD that corresponds to the residual amount of ash. The process is repeated by the electronic control device 50 at predetermined time intervals. The series of processes constitute a noncombustible matter estimating section.

When the procedure is started, the electronic control device 50 determines whether it is immediately after the termination of the burn-up control at step S410. If it is determined that it is not immediately after the termination of the burn-up control, that is, if the decision outcome of step S410 is negative, the electronic control device 50 temporarily suspends the routine.

On the other hand, if it is determined that it is immediately after the termination of the burn-up control, that is, if the decision outcome of step S410 is positive, the electronic control device 50 proceeds to step S420. At step S420, the electronic control device 50 reads the current pressure difference ΔP. Then, at step S430, the electronic control device 50 computes the difference between the pressure difference ΔP that is read immediately after the termination of the preceding burn-up control and the pressure difference ΔP that is read immediately after the termination of the current burn-up control to obtain the ash learned value gD. The electronic control device 50 then temporarily suspends the current process.

Figure 9:
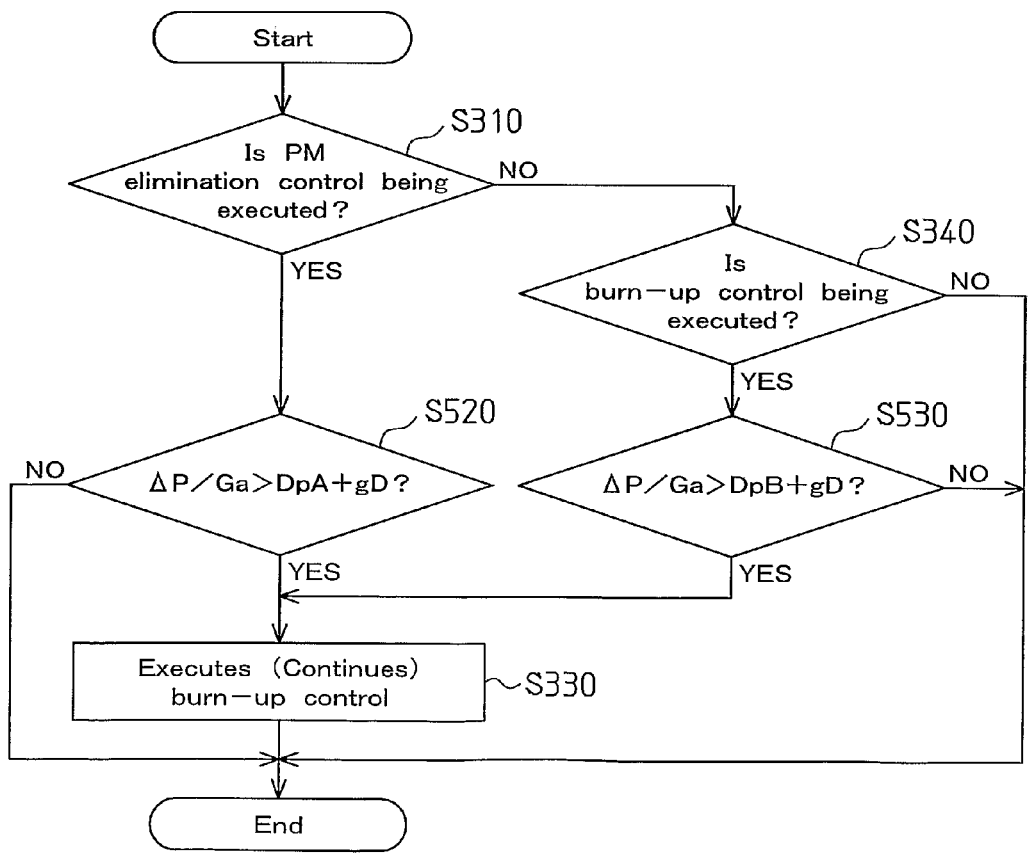
FIG. 9 is a flowchart showing a procedure for comparing the pressure difference according to the fourth embodiment.

A series of processes shown in FIG. 9 represents a procedure of a case where the procedure for comparing the pressure differences explained in the third embodiment is performed using the ash learned value gD computed in the fourth embodiment. In FIG. 9, the same reference numerals are given to the processes that are the same as those in FIG. 6.

As shown in FIG. 9, at step S520, the electronic control device 50 compares the value ΔP/Ga with a value obtained by adding the ash learned value gD to the pressure difference reference value DpA, that is, the pressure difference reference value increased by the amount of the pressure difference increased by the residual ash. At step S530, the electronic control device 50 compares the value ΔP/Ga with the value obtained by adding the ash learned value gD to the pressure difference reference value DpB in the same manner. As described above, since each pressure difference reference value is corrected based on the ash learned value gD, even if noncombustible matter remains in the DPNR converter 26, the determination accuracy is secured in a suitable manner when comparing the pressure difference and making a decision. Therefore, the manner of adding fuel is switched to the intermittent fuel addition in a suitable manner. The procedure for correcting the pressure difference reference value in steps S520 and S530 constitute a correction section.

Instead of correcting the pressure difference reference value using the ash learned value gD, the pressure difference ΔP may be corrected using the ash learned value gD. The same advantage is obtained in this case also. For example, at step S520, the value ΔP/Ga is computed using a value obtained by subtracting the ash learned value gD from the pressure difference ΔP, that is, the pressure difference corrected by the amount of the pressure difference increased by the residual ash. At step S530 also, the value ΔP/Ga may be computed using a value obtained by subtracting the ash learned value gD from the pressure difference ΔP.

The correction of the pressure difference reference value and the pressure difference using the ash learned value gD may also be applied to the first and second embodiments in the same manner.

Fifth Embodiment

An exhaust purifying apparatus for an internal combustion engine according to a fifth embodiment of the present invention will now be described with reference to FIG. 10.

As the intake air amount of the internal combustion engine decreases, that is, as the flow rate of exhaust gas decreases, the pressure difference ΔP tends to vary by a larger amount. When the pressure difference ΔP vary by a large amount, the determination result in the comparison of the pressure difference tends to vary. Accordingly, the reliability of the determination result is decreased.

Therefore, according to the fifth embodiment, if the intake air amount Ga is greater than or equal to a predetermined amount Gamin, the electronic control device 50 compares the value ΔP/Ga with the pressure difference reference value Dp in the procedure of the first embodiment.

Figure 10:
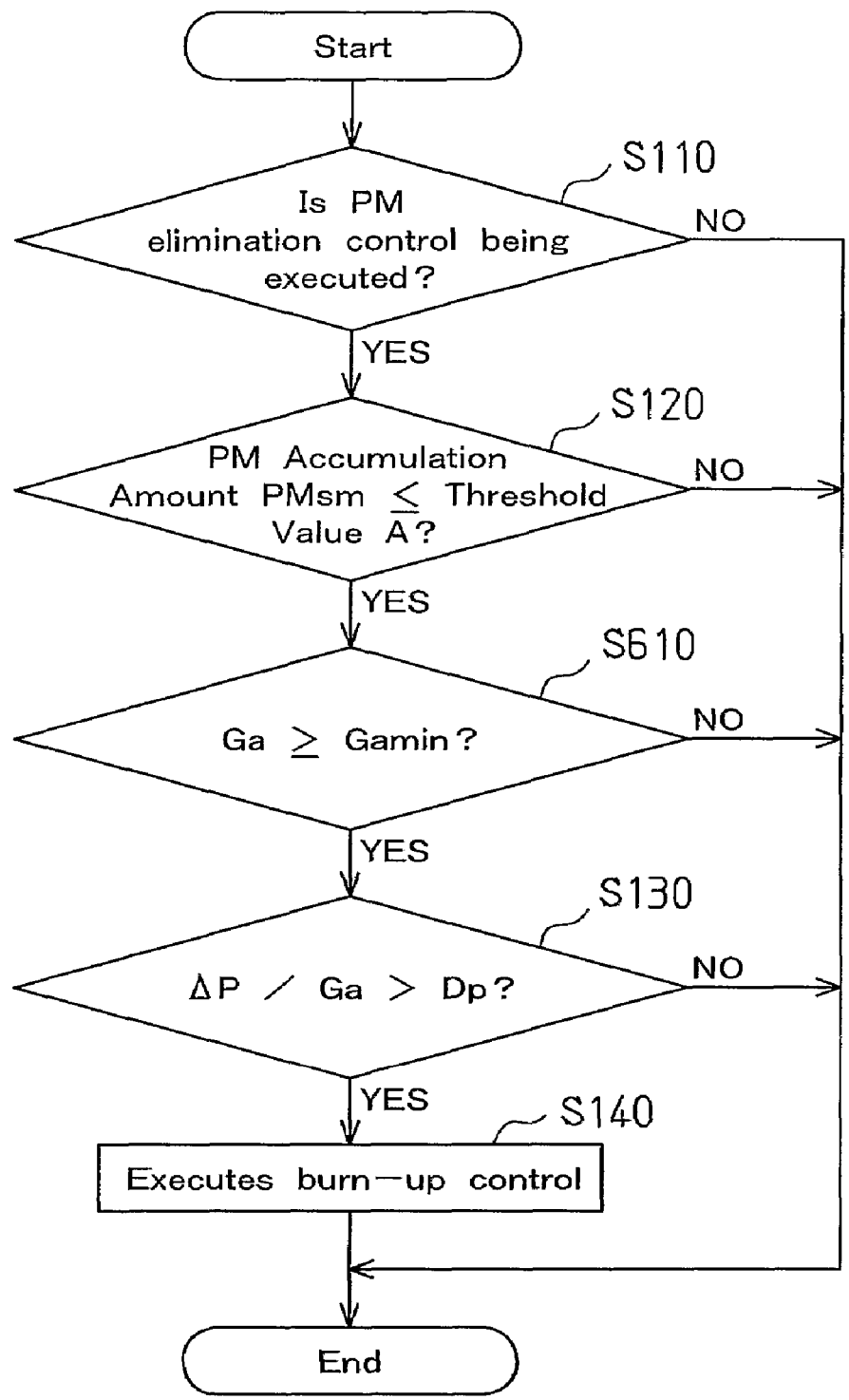
FIG. 10 is a flowchart showing a procedure for a burn-up control according to the fifth embodiment.

That is, as shown by a series of processes in FIG. 10, a process (step S610) for determining whether the intake air amount Ga is greater than or equal to the predetermined amount Gamin is added before the process of step S130 explained in the first embodiment. Therefore, if the intake air amount Ga is less than the predetermined amount Gamin, that is, if the decision outcome of step S610 is negative, the electronic control device 50 temporarily suspends the burn-up control process without comparing the value ΔP/Ga with the pressure difference reference value Dp.

On the other hand, if it is determined that the intake air amount Ga is greater than or equal to the predetermined amount Gamin, that is, if the decision outcome of step S610 is positive, the electronic control device 50 compares the value ΔP/Ga with the pressure difference reference value Dp.

As described above, in the fifth embodiment, since the electronic control device 50 compares the pressure difference when the intake air amount Ga is greater than or equal to the predetermined amount Gamin, the reliability of the determination result is prevented from being decreased.

The same advantage is obtained by detecting the pressure difference ΔP when the intake air amount Ga is greater than or equal to the predetermined amount Gamin.

The comparison of the intake air amount Ga with the predetermined amount Gamin may also be applied to the second to fourth embodiments in the same manner.

Sixth Embodiment

An exhaust purifying apparatus for an internal combustion engine according to a sixth embodiment of the present invention will now be described with reference to FIG. 11.

In the sixth embodiment, the electronic control device 50 computes the average value of the pressure differences detected during a period from the point in time for comparing the pressure difference until a predetermined time elapses. The electronic control device 50 uses the computed average value as the pressure difference ΔP in the first to fifth embodiments.

Figure 11:
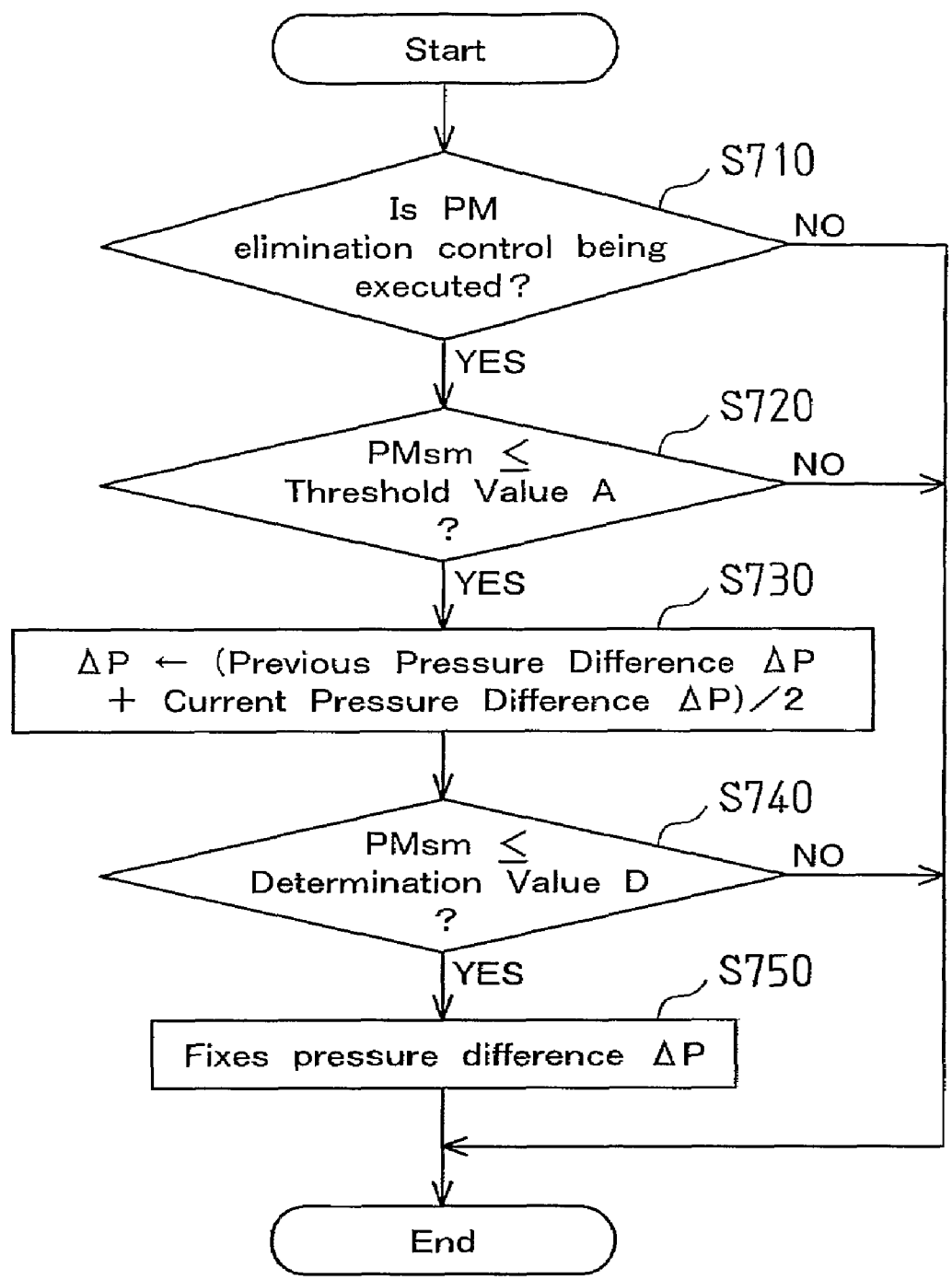
FIG. 11 is a flowchart showing a procedure for computing the average value of the pressure difference according to a sixth embodiment.

A series of processes shown in FIG. 11 represents a procedure for computing the average value of the pressure difference ΔP in the sixth embodiment. The procedure is repeated by the electronic control device 50 at predetermined time intervals.

When the procedure is started, the electronic control device 50 determines whether the PM elimination control is being executed at step S710. The process of step S710 is the same as the process of step S110 shown in FIG. 2. If it is determined that the PM elimination control is not being executed, that is, if the decision outcome of step S710 is negative, the electronic control device 50 temporarily suspends the routine.

On the other hand, if it is determined that the PM elimination control is being executed, that is, if the decision outcome of step S710 is positive, the electronic control device 50 proceeds to step S720. At step S720, the electronic control device 50 determines whether the current PM accumulation amount PMsm is less than or equal to the threshold value A. If it is determined that the PM accumulation amount PMsm is greater than the threshold value A, that is, if the decision outcome of step S720 is negative, the electronic control device 50 temporarily suspends the routine.

On the other hand, if it is determined that the PM accumulation amount PMsm is less than or equal to the threshold value A, that is, if the decision outcome of step S720 is positive, in other words, if it is the point in time where the above mentioned comparison of the pressure difference is performed, the electronic control device 50 proceeds to step S730. At step S730, the electronic control device 50 computes the average value of the previously read pressure difference ΔP and the currently read pressure difference ΔP. The average value is used as a provisional value of the pressure difference ΔP.

The electronic control device 50 then proceeds to step S740 and determines whether the PM accumulation amount PMsm is less than or equal to a determination value D. The determination value D is set to a value smaller than the threshold value A. If it is determined that the PM accumulation amount PMsm is greater than the determination value D, the electronic control device 50 temporarily suspends the routine. The average value of the pressure difference ΔP is updated by repeatedly executing the procedure until the PM accumulation amount PMsm becomes less than or equal to the determination value D.

On the other hand, if it is determined that the PM accumulation amount PMsm is less than or equal to the determination value D at step S740, that is, if the decision outcome of step S740 is positive, the electronic control device 50 proceeds to step S750. At step S750, the electronic control device 50 fixes the currently computed average value as the pressure difference ΔP and temporarily suspends the routine.

As described above, in the sixth embodiment, the electronic control device 50 computes the average value of the pressure differences detected from when it is determined that the PM accumulation amount PMsm is less than or equal to the threshold value A until when it is determined that the PM accumulation amount PMsm is less than or equal to the determination value D, that is, from the point in time where the pressure difference is compared until when the predetermined time elapses. Therefore, the variation of the pressure difference is prevented from affecting the comparison determination of the pressure difference.

In the sixth embodiment, the electronic control device 50 updates the average value of the pressure differences until when the PM accumulation amount PMsm becomes less than or equal to the determination value D. However, the electronic control device 50 may update the average value of the pressure differences from the point in time where the pressure difference is compared until when a predetermined time elapses.

Instead of computing the average value in the process of step S730, the detected pressure differences may be subjected to a smoothing process to compute a smoothed value of the pressure differences. The same advantage is obtained in this case also.

Seventh Embodiment

An exhaust purifying apparatus for an internal combustion engine according to a seventh embodiment of the present invention will now be described with reference to FIG. 12.

Figure 12:
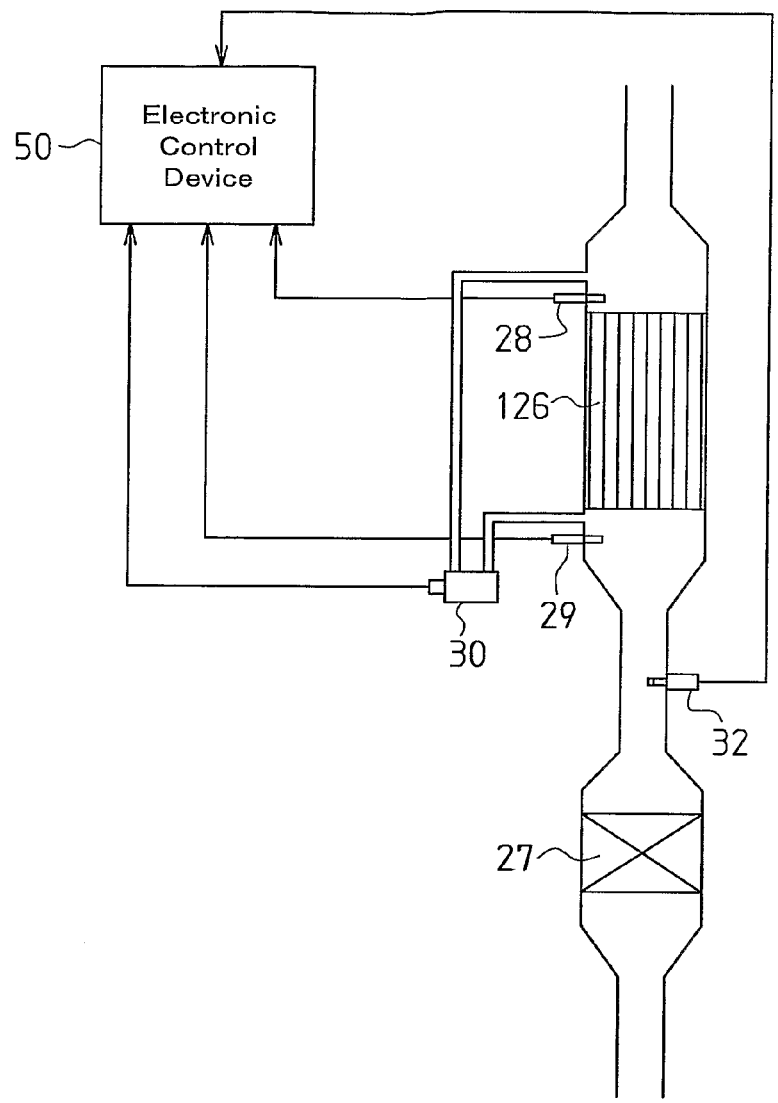
FIG. 12 is a diagrammatic view illustrating the structure of an exhaust purifying apparatus according to a seventh embodiment.

The seventh embodiment differs from the first embodiment in that the exhaust purifying apparatus is equipped with a DPNR converter 126 as shown in FIG. 12 instead of two converters such as the NOx catalytic converter 25 and the DPNR converter 26 of the first embodiment. Like the first embodiment, an input gas temperature thci, which is the temperature of exhaust gas that flows into the DPNR converter 126, is detected by the first gas temperature sensor 28. An output gas temperature thco, which is the temperature of exhaust gas that has passed through the DPNR converter 126, is detected by the second gas temperature sensor 29. The differential pressure sensor 30 detects the pressure difference ΔP between the pressure at a section upstream of the DPNR converter 126 and the pressure at a section downstream of the DPNR converter 126.

With this structure, when fuel keeps being added to the DPNR converter 126, the fuel continues to be burned at the upstream section of the DPNR converter 126. Thus, exhaust gas having high temperature is continuously sent to the downstream section of the DPNR converter 126. Therefore, the temperature of the DPNR converter 126 is likely to increase toward the downstream section. Thus, particulate matter tends to remain at the upstream section of the DPNR converter 126. When fuel is continuously added, the temperature of the upstream section of the DPNR converter 126 tends to stay low. Therefore, particulate matter easily collects on the front end portion of the DPNR converter 126. As a result, clogging may occur.

On the other hand, when intermittently adding fuel to exhaust gas, exhaust gas having high temperature is prevented from being continuously sent to the downstream section of the DPNR converter 126. This suppresses the temperature distribution of the DPNR converter 126 from being uneven. Therefore, the amount of particulate matter partially remaining in the DPNR converter 126 is decreased and the amount of particulate matter collected at the front end portion of the DPNR converter 126 is also decreased in a suitable manner.

Therefore, the burn-up control process such as that described in the first embodiment is also executed in the seventh embodiment. The seventh embodiment thus has the same advantages as the first embodiment.

Also, the exhaust purifying apparatus according to the seventh embodiment may be embodied in the same manner as the second to sixth embodiments to obtain the advantages corresponding to each embodiment.

The above embodiments may be modified as follows.

Figure 13:
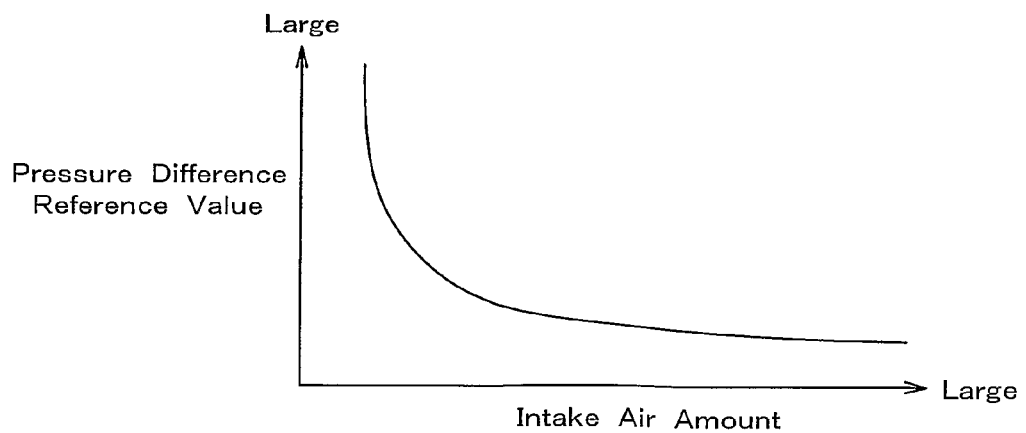
FIG. 13 is an explanatory diagram illustrating the relationship between the pressure difference reference value and the intake air amount according to a modification of each embodiment.

As described above, as the intake air amount of the internal combustion engine decreases, the determination result obtained in the comparison determination of the pressure difference in each embodiment tends to vary. Accordingly, the reliability of the result is decreased. Therefore, the pressure difference reference value in each embodiment may be set to a greater value as the intake air amount is decreased as shown in FIG. 13. In this case, as the intake air amount is decreased, the intermittent fuel addition becomes less likely to be executed. This prevents the manner of adding fuel from being switched to the intermittent fuel addition due to an erroneous determination made in the comparison of the pressure difference in a suitable manner.

Instead of detecting the intake air amount Ga by the air flow meter 16, the flow rate of exhaust gas may be computed based on the operating condition of the internal combustion engine 10 such as the engine rotational speed NE and the fuel injection amount. The computed flow rate of exhaust gas may be used instead of the intake air amount Ga.

The NOx catalytic converter 25 may be other catalytic converter, or the DPNR converter 26, 126 may be a filter, which has only a function of trapping particulate matter. In these cases, the present invention may be applied in the same manner.

The invention claimed is:

1. A method for purifying exhaust gas of an internal combustion engine, comprising:
   trapping particulate matter in exhaust gas by an exhaust purifying mechanism located in an exhaust passage of the internal combustion engine;
   adding fuel to exhaust gas that passes through the exhaust purifying mechanism, to increase the temperature of the exhaust purifying mechanism so as to burn particulate matter;
   detecting a pressure difference between a section upstream and a section downstream of the exhaust purifying mechanism;
   comparing an estimated accumulation amount of particular matter in the exhaust purifying mechanism with a threshold value when continuous fuel addition is being executed;
   comparing the pressure difference with a pressure difference reference value when the continuous fuel addition is being executed; and
   switching the manner of adding fuel from the continuous fuel addition to intermittent fuel addition such that the temperature distribution of the exhaust purifying mechanism is suppressed from being uneven when it is determined that the estimated accumulation amount of particulate matter becomes equal to or less than the threshold value and the pressure difference exceeds the pressure difference reference value,
   wherein the threshold value is a value for determining that the intermittent fuel addition does not cause abrupt burning of particulate matter, and the pressure difference reference value is a value for determining that the continuous fuel addition does not cause sufficient burning of particulate matter.

2. An exhaust purifying apparatus for an internal combustion engine, comprising:
   an exhaust purifying mechanism that is located in an exhaust passage of the internal combustion engine, wherein the exhaust purifying mechanism traps particulate matter in exhaust gas;
   a fuel adding device for adding fuel to exhaust gas that passes through the exhaust purifying mechanism, to increase the temperature of the exhaust purifying mechanism so as to burn particulate matter;
   a detecting section that detects a pressure difference between a section upstream and a section downstream of the exhaust purifying mechanism;
   a first comparing section, wherein, when the fuel adding device is continuously adding fuel to exhaust gas, the first determining section compares an estimated accumulation amount of particular matter in the exhaust purifying mechanism with a threshold value;
   a second comparing section, wherein, when the fuel adding device is continuously adding fuel to exhaust gas, the second comparing section compares the pressure difference that is detected by the detecting section with a pressure difference reference value; and
   a setting section, wherein, when the first determining section determines that the estimated accumulation amount of particular matter becomes equal to or less than the threshold value and the second comparing section determines that the pressure difference exceeds the pressure difference reference value, the setting section switches the manner of adding fuel of the fuel adding device from the continuous fuel addition to intermittent fuel addition such that the temperature distribution of the exhaust purifying mechanism is suppressed from being uneven,
   wherein the threshold value is a value for determining that the intermittent fuel addition does not cause abrupt burning of particulate matter, and the pressure difference reference value is a value for determining that the continuous fuel addition does not cause sufficient burning of particulate matter.

3. The exhaust purifying apparatus according to claim 2, wherein, when an estimated accumulation amount of particulate matter in the exhaust purifying mechanism becomes zero after setting the manner of adding fuel to the intermittent fuel addition, the setting section ends the intermittent fuel addition.

4. The exhaust purifying apparatus according to claim 2, wherein, after setting the manner of adding fuel to the intermittent fuel addition, the setting section sets the fuel addition of the intermittent fuel addition to be performed a predetermined number of times.

5. The exhaust purifying apparatus according to claim 2, wherein, when an intake air amount of the internal combustion engine is equal to or more than a predetermined amount, the second comparing section compares the pressure difference with the pressure difference reference value.

6. The exhaust purifying apparatus according to claim 2, wherein, when an intake air amount of the internal combustion engine is equal to or more than a predetermined amount, the detecting section detects the pressure difference between a section upstream and a section downstream of the exhaust purifying mechanism.

7. The exhaust purifying apparatus according to claim 2, wherein the pressure difference reference value is increased as the intake air amount of the internal combustion engine is decreased.

8. The exhaust purifying apparatus according to claim 2, wherein the pressure difference includes an average value of pressure differences detected during a period from the point in time until a predetermined time elapses.

9. The exhaust purifying apparatus according to claim 2, wherein the pressure difference includes a value obtained by smoothing pressure differences detected during a period from the point in time until a predetermined time elapses.

10. The exhaust purifying apparatus according to claim 2, wherein the exhaust purifying mechanism includes an exhaust purification catalyst through which particulate matter in exhaust gas passes and an exhaust purifying member that is located downstream of the exhaust purification catalyst and traps the particulate matter, and wherein the detecting section detects a pressure difference between a section upstream and a section downstream of the exhaust purifying member.

11. The exhaust purifying apparatus according to claim 2, wherein the pressure difference reference value is a first pressure difference reference value, and wherein, after the setting section sets the manner of adding fuel to the intermittent fuel addition, the second comparing section compares the pressure difference detected by the detecting section with a second pressure difference reference value.

12. The exhaust purifying apparatus according to claim 11, wherein, when the pressure difference becomes equal to or less than the second pressure difference reference value, the setting section ends the intermittent fuel addition.

13. The exhaust purifying apparatus according to claim 2, further comprising an estimating section and a correction section, wherein the estimating section estimates the amount of noncombustible matter in the exhaust purifying mechanism based on the pressure difference detected when the intermittent fuel addition is ended, and wherein the correction section corrects the pressure difference detected by the detecting section based on the amount of noncombustible matter estimated by the estimating section.

14. The exhaust purifying apparatus according to claim 13, wherein the estimating section estimates the amount of noncombustible matter based on the pressure difference detected when the preceding intermittent fuel addition was ended and the pressure difference when the current intermittent fuel addition is ended.

15. The exhaust purifying apparatus according to claim 2, further comprising an estimating section and a correction section, wherein the estimating section estimates the amount of noncombustible matter in the exhaust purifying mechanism based on the pressure difference detected when the intermittent fuel addition is ended, and wherein the correction section corrects the pressure difference reference value based on the amount of noncombustible matter estimated by the estimating section.

16. The exhaust purifying apparatus according to claim 15, wherein the estimating section estimates the amount of noncombustible matter based on the pressure difference detected when the preceding intermittent fuel addition was ended and the pressure difference when the current intermittent fuel addition is ended.

* * * * *